United States Patent Office 3,509,182
Patented Apr. 28, 1970

3,509,182
PRODUCTION OF ACETALS AND MERCAPTALS
Leslie O. Hopkins, Harry Stephenson, and Donald R. Maciver, Nakuru, Kenya, assignors to The Pyrethrum Board of Kenya, Nakuru, Kenya, a body corporate of Kenya
No Drawing. Filed Mar. 9, 1967, Ser. No. 621,771
Claims priority, application Great Britain, Mar. 24, 1966, 12,938/66
Int. Cl. C07d 13/10; C07c 149/30, 41/10
U.S. Cl. 260—340.5          9 Claims

ABSTRACT OF THE DISCLOSURE

In order to minimise the formation of colour-imparting impurities in the production of acetals and bis-mercaptals of aromatic aldehydes which contain one benzene ring and a maximum of 12 carbon atoms and which are free from basic and acidic functional groups by condensation thereof with two moles of an alkanol, an aralkanol, or an ether-alcohol having the formula $HO(C_nH_{2n}O)_xR'$ in which R' is an alkyl group having 1 to 6 carbon atoms, $n$ is 2 or 3 and $x$ is 1, 2 or 3, or with a corresponding thiol, the condensation is carried out by heating together under reflux the aldehyde and the selected alcohol or thiol in the presence of (i) an oxygen-containing atmosphere, (ii) a finely divided activated carbon which in aqueous suspension exhibits an acid pH and (iii) an entraining agent for water. The acetals of piperonaldehyde, 6-allyl-piperonaldehyde and 6-n-propylpiperonaldehyde which are useful as pyrethrum synergists are readily produced in this way.

This invention relates to the production of acetals and mercaptals of aromatic aldehydes.

In patent application No. 564,022, now Patent No. 3,310,463, we have disclosed that the piperonyl acetals derived from alkanols having the general formula $$HO(C_nH_{2n}O)_xR$$

in which R is an alkyl group having one to six carbon atoms, $n$ is 2 or 3 and $x$ is 1, 2 or 3, are valuable synergists for insecticidal pyrethroid materials. The method of preparing the acetals disclosed in the said patent specification is expensive and unsuitable for manufacture of the acetals on a substantial scale. It is accordingly an object of the present invention to provide a process for the production of the acetals and thiols of aromatic aldehydes which is simple to perform and more economical than the known method.

A known general method for the production of hemi-acetals and acetals is by the condensation of an aldehyde with an alcohol in the presence of a mineral acid, e.g. hydrogen chloride, a strong organic acid, e.g. para-toluene-sulphonic acid, or a salt such as ferric chloride. This reaction is normally carried out in the presence of a considerable excess of alcohol and in the presence of a suitable entraining agent such as a petroleum fraction. When applied to the condensation of aromatic aldehydes with higher alcohols and water-miscible ether alcohols and ether thiols it is found that a substantial amount of tars and other decomposition products are formed which can only be satisfactorily eliminated by neutralisation and distillation.

The acetals and mercaptals, with which the present invention is conecrned, however, are very high boiling liquids and thus correspondingly difficult to distil without decomposition. Moreover, for the intended use the acetals of the water-miscible ether alcohols must be free from any irritant material, such as hydrogen chloride, since it is intended for introduction into an atmosphere which human beings and animals are to breathe.

Whilst the water-miscible ether alcohol and thiol starting materials are reasonably readily available, alternative starting materials such as the corresponding orthoformic esters are not readily available. It is thus desirable to have available an economic method for the production of acetals and mercaptals of aromatic aldehydes, especially those with the higher alcohols and with water-miscible ether alcohols and ether thiols, which eliminates the production of tars and other decomposition products, whilst ensuring that a product free from irritant materials is obtained and is moreover capable of giving a high yield thereof.

In accordance with the present invention there is provided a process for the production of an acetal or of a mercaptal of an aromatic aldehyde which comprises heating together under reflux and in the presence of an oxygen-containing atmosphere a mixture of (a) an aromatic aldehyde having not more than 12 carbon atoms, which is free from basic and acidic functional groups, (b) an alcohol or thiol having the general formula HXR in which X is an oxygen or sulphur atom and R is an alkyl or aralkyl group having from 5 to 15 carbon atoms or a group having the general formula $$-(C_nH_{2n}O)_xR'$$

in which R' is an alkyl group having one to six carbon atoms, $n$ is 2 or 3, $x$ is 1, 2 or 3, and the total number of carbon atoms in the group is at least five, (c) a finely divided activated carbon which in aqueous suspension exhibits an acid pH value, and (d) an entraining agent for water.

The aromatic aldehyde having not more than twelve carbon atoms has one benzene ring and substituents including the aldehyde group containing not more than six carbon atoms. The benzene ring may contain aliphatic hydrocarbon substituents having a total of not more than five carbon atoms, e.g. one or two methyl and/or ethyl groups, or an isopropyl or allyl group and these may be present in any position or positions. The benzene ring may contain one or more ether groups, e.g. one or more methoxy or ethoxy groups present as substituents in any position or positions in the benzene ring or two ether groupings may together form a heterocycle, e.g. a dioxymethylene ring. The aldehyde group may be present as a substituent in the benzene ring or may be attached to an aliphatic hydrocarbon substituent i.e. to an alkylene or alkenylene group. It is preferred that the aromatic aldehyde contain only carbon, oxygen and hydrogen atoms but the presence of such substituents as halogen atoms, e.g. chlorine and bromine atoms is permissible. Substituents having basic or acidic functions such as primary and secondary amino groups or carboxylic acid or sulphonic acid groups should however be avoided.

The method of the present invention is useful not only in preparing acetals of aldehydes having an ether function which are useful as pyrethrum synergists but also the acetals of other aromatic ether aldehydes, of aldehydes having an ethylenically unsaturated side-chain attached to a benzene ring and of aldehydes having both an ether function or functions and an ethylenically unsaturated side-chain attached to a benzene ring. The corresponding mercaptals may also be prepared by such method.

Examples of aldehydes which may be used in the present process include benzaldehyde, para-isopropylbenzaldehyde, cinnamaldehyde, γ-phenylpropionaldehyde, para-chlorobenzaldehyde, anisaldehyde, piperonaldehyde, 6-allylpiperonaldehyde and 6-n-propylpiperonaldehyde.

The alcohol and thiols which react with the aromatic aldehydes may be straight or branched chain alkanols, aralkanols and ether alkanols and aralkanols having from 5 to 15 carbon atoms. Examples include n-hexanol, 2-ethylhexanol, lauryl alcohol, benzyl alcohol, phenylethanol, n-octanthiol, n-dodecanthiol, 2-n-butoxyethanol, 2-ethoxyethanol, 2-(2'-n-butoxyethoxy)ethanol, 2-(2'-ethoxyethoxy)ethanol, 2-[2' - (2'''-ethoxyethoxy)ethoxy]-ethanol and 2-(2'-n-butoxyethoxy)ethanthiol.

Preferably the alcohols and thiols are used in a substantial molar excess with respect to the aromatic aldehyde e.g. from 3 to 15 moles, preferably 4 to 10 moles of alcohol or thiol for each mole of aldehyde.

The reaction is carried out in the presence of a finely divided activated carbon which exhibits an acid pH (below 6.9) in aqueous suspension. In order to test the carbon a 4 gram sample is weighed out and shaken with 100 ml. of distilled water for 2 minutes: this produces a suspension of carbon in water and the pH value of this suspension is then determined using a calomel/glass electrode pH meter. The pH meter used for testing the carbons used in the appended examples was a Pye Universal pH meter. The preferred carbons are those which show a pH value in the range of 4 to 6 when thus determined. Carbons exhibiting a lower pH value, e.g. as low as 2.0, may be used but tend to promote the formation of colour and may introduce an excessive acidity, both of which can be undesirable for certain intended uses.

Whilst the activated carbon acts as a catalyst it has been demonstrated experimentally that there is nevertheless a quantity effect. On a molar basis it is preferred that the amount of activated carbon be greater than that of aromatic aldehyde. Preferably at least 1.5 moles, and more preferably at least 2.0 moles, of carbon are present in the reaction mixture per mole of aldehyde. The reaction appears to reach a maximum speed when 2.5 moles of carbon are present per mole of aldehyde. Larger quantities e.g. 5 and 6 molar proportions of carbon have been used but without increasing the rate of reaction.

The reaction between the aldehyde and the alcohol or thiol involves the elimination of the elements of water and consequently removal of water from the reaction mixture favours production of the desired acetals and thiols. In order to remove the unwanted water from the reaction mixture an entraining agent for water is present. The preferred entraining agents are the normally liquid aliphatic and aromatic hydrocarbons and mixtures thereof. Thus there may be used benzene, toluene or a light petroleum fraction having a boiling point range of 100–120° C.

In carrying out the reaction the several ingredients are placed in a reactor equipped with a refluxing head and a Dean and Stark trap and the mixture refluxed until no more water is evolved. The entraining agent after separation of entrained water may be returned to the refluxing mixture in customary manner. After completion of refluxing the reaction mixture is brought to room temperature, filtered to remove carbon, treated with a neutralising agent such as magnesium oxide, again filtered and the entraining agent and excess of alcohol or thiol then removed. For many purposes the residual acetal which may contain a small proportion of unchanged aromatic aldehyde may be used as thus isolated. Unchanged aldehyde can usually be removed by distillation under reduced pressure when this is desired.

The process just described is carried out in the presence of air or other oxygen-containing atmosphere. Replacement of air by an inert gas such as nitrogen or argon prevents the reaction taking place. On the other hand there is no need to pass a current of air or other oxygen-containing atmosphere through the reaction mixture as this does not increase the rate of reaction. It is considered that the oxygen dissolved in the reactants and/or the entraining agent is a factor in bringing about the reaction but in what way is not apparent. It is preferred to maintain an atmosphere containing not more than 30% by volume of oxygen in contact with the reaction mixture.

The following examples illustrate the process of the invention.

EXAMPLE 1

Piperonaldehyde 50 gms. (0.33 mole), 2-(2'-butoxyethoxy)ethanol 520 gms. (10 moles), M & B (as hereinafter used, the term "M & B" is a standard abbreviation for May & Baker Limited, a corporation of Dagenham, Essex, England) decolorising carbon (pH=4.4) 10 gms. (0.83 mole) and 500 ml. of a light petroleum fraction B.P. 100–120° C. were charged to a reactor of 2 litres capacity fitted with a reflux condenser and a Dean & Stark trap. The mixture was heated under reflux during 7.5 hours during which water collected continuously until 6 ml. (0.33 mole) had separated. After a further 12 hours heating an additional 1.8 ml. (0.1 mole) of water had collected. The additional water is believed to be due to water present in the starting materials which had not been specially treated to render then anhydrous.

The reaction mixture was then cooled and filtered to remove carbon. Finely divided magnesium oxide (10 gms.) was added to the filtrate and thoroughly shaken therewith. The mixture was then filtered once more.

The light petroleum and excess 2-(2'-butoxyethoxy) ethanol were removed by distillation under reduced pressure up to 150° C./0.02 mm. of mercury. A pale residue weighing 149 gms. (0.328 mole upon a basis of acetal: 98% of theory) remained which was shown by spectrophotometric examination to contain less than 1% of unreacted piperonaldehyde.

EXAMPLE 2

The procedure of Example 1 was repeated using piperonaldehyde 15 gms. (0.1 mole), 2-[2'-(2''-ethoxyethoxy)ethoxy]ethanol 178 gms. (1.0 mole, M & B decolorising carbon 6 gms. (0.5 mole) and 200 ml. of light petroleum B.P. 100–120° C. The total amount of water collected was 2.2 ml. (0.122 mole) and the yield of acetal was 42.5 gms. (87% of theory) which was shown to contain less than 1% of unreacted piperonaldehyde.

EXAMPLE 3

The procedure of Example 1 was repeated using piperonaldehyde 30 gms. (0.2 mole), benzyl alcohol 216 gms. (2.0 moles), M & B decolorising carbon 6 gms. (0.5 mole) and 250 ml. of light petroleum B.P. 100–120° C. The total amount of water collected was 6.1 ml. (0.339 mole) and the yield of the acetal was 68 gms. (98% of theory).

EXAMPLE 4

The procedure of Example 1 was repeated using piperonaldehyde 30 gms. (0.2 mole), lauryl alcohol 186 gms. (2.0 moles), M & B decolorising carbon 10 gms. (0.83 mole) and 200 ml. of light petroleum B.P. 100–120° C. The total amount of water collected was 3.8 ml. (0.21 mole) and the yield of the acetal was 99 gms. (99% of theory).

EXAMPLE 5

The procedure of Example 1 was repeated using cinnamaldehyde 13.2 gms. (0.1 mole), Darco decolorising charcoal KB grade (pH=6.2) 3 gms. (0.25 mole), diethyleneglycol monoethyl ether 80 gms. (0.6 mole) and 200 ml. of light petroleum B.P. 100–120° C. The total amount of water collected was 4.5 ml. and the yield of the acetal was 30 gms. (79% of theory).

EXAMPLE 6

The procedure of Example 1 was repeated using benzaldehyde 10.6 gms. (0.1 mole), diethyleneglycol mono-n-butyl ether 97 gms. (0.6 mole), Darco decolorising charcoal KB grade 3 gms. (0.25 mole) and 200 ml. of petroleum ether B.P. 100–120° C. The yield of the acetal was 41 gms. (99% of theory).

EXAMPLE 7

The procedure of Example 1 was repeated using piperonaldehyde 45 gms. (0.3 mole), 2-(2'-n-butoxyethoxy) ethanthiol 113.5 gms. (0.64 mole), M & B decolorising carbon 9 gms. (0.75 mole) and 500 ml. of toluene. The total amount of water collected was 5.3 ml. (0.292 mole) and the yield of the mercaptal was 138 gms. (94.5% of theory).

EXAMPLE 8

The procedure of Example 1 was repeated using piperonaldehyde 45 gms. (0.3 mole), n-octanthiol 109.5 gms. (0.75 mole) M & B decolorising carbon 9 gms. (0.75 mole) and 150 ml. of light petroleum B.P. 100–120° C. In this case water had finished distilling after 3.25 hours and the yield of mercaptal was 116 gms. (92% of theory).

EXAMPLE 9

The procedure of Example 1 was repeated using piperonaldehyde 22.4 gms. (0.15 mole), n-dodecanthiol 75.5 gms. (0.37 mole), M & B decolorising carbon 4.5 gms. (0.37 mole) and 150 ml. of light petroleum B.P. 100–120° C. In this case removal of water took 18 hours after which the yield of mercaptal was 65 gms. (81.5% of theory).

All of the above products were obtained in substantially colourless condition. The acetals obtained in Examples 1 and 2 were suitable for use as synergists for pyrethroid materials as described in application No. 564,022, now Patent No. 3,310,463, without any further purification.

We claim:

1. Process for the production of acetals and mercaptals of aromatic aldehydes which comprises heating together under reflux and in the presence of an oxygen-containing atmosphere (a) an aromatic aldehyde having one benzene ring and not more than twelve carbon atoms in the molecule, said aldehyde being free from basic and acidic functional groups, (b) a compound selected from alcohols and thiols having the formula HXR in which X is an oxygen or sulphur atom and R is an alkyl or aralkyl group having from 5 to 15 carbon atoms or a group having the formula $$-(C_nH_{2n}O)_xR'$$

in which R' is an alkyl group having at least one but less than seven carbon atoms, $n$ is an integer greater than one but less than four, $x$ is an integer which is at least one but less than four and the total number of carbon atoms in said group is at least five, (c) a finely divided activated carbon which, when a 4 gram sample is shaken with 100 ml. of distilled water for 2 minutes, yields an aqueous suspension having a pH of at least 2.0 but less than 6.9, and (d) an entraining agent for water.

2. The process claimed in claim 1 in which said activated carbon exhibits, in aqueous suspension, a pH in the range of 2 to 6.

3. The process claimed in claim 1 in which 1.5 to 6 moles of said activated carbon are present per mole of said aldehyde.

4. The process claimed in claim 3 in which said activated carbon exhibits, in aqueous suspension, a pH in the range of 4 to 6.

5. The process claimed in claim 1 in which said compound having the formula HXR is present in a proportion of 3 to 15 moles per mole of said aldehyde.

6. The process claimed in claim 1 in which said aromatic aldehyde contains only carbon, hydrogen and oxygen atoms in the molecule.

7. The process claimed in claim 6 in which said aromatic aldehyde contains at least one but not more than two ether groups as substituents in the benzene ring.

8. The process claimed in claim 7 in which said aldehyde is selected from anisaldehyde, piperonaldehyde, 6-allylpiperonaldehyde and 6-n-propylpiperonaldehyde.

9. The process calimed in claim 1 in which said aromatic aldehyde contains only carbon, hydrogen and oxygen atoms in the molecule, said compound having the formula HXR is an alcohol having the formula $HO(C_nH_{2n}O)_xR'$ in which R', $n$ and $x$ are as defined in claim 1 and present in a proportion of 3 to 15 moles per mole of said aldeheyde, and said activated carbon is present in a proportion of 1.5 to 6 moles per mole of aldehyde and exhibits, in aqueous suspension, a pH in the range of 4 to 6.

References Cited

Bell et al., "Journal of Organic Chemistry," vol. 30 (12), 1965, pp. 4284–92.

ALEX MAZEL, Primary Examiner

J. H. TURNIPSEED, Assistant Examiner

U.S. Cl. X.R.

260—609, 611; 424—188, 193